United States Patent
Dai et al.

(10) Patent No.: US 9,208,405 B2
(45) Date of Patent: Dec. 8, 2015

(54) SYSTEMS AND METHODS FOR DIGITAL IMAGE ANALYSIS

(75) Inventors: Shengyang Dai, San Jose, CA (US); Su Wang, San Jose, CA (US); Akira Nakamura, Cupertino, CA (US); Takeshi Ohashi, Kanagawa (JP); Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 719 days.

(21) Appl. No.: 12/851,818

(22) Filed: Aug. 6, 2010

(65) Prior Publication Data

US 2012/0033861 A1 Feb. 9, 2012

(51) Int. Cl.
*G06K 9/00* (2006.01)
*G06K 9/62* (2006.01)

(52) U.S. Cl.
CPC ............ *G06K 9/6292* (2013.01); *G06K 9/6254* (2013.01)

(58) Field of Classification Search
CPC .............. G06T 7/0012; G06T 2207/30024; G06T 7/0081; G06T 2207/20084; G06K 2209/05; G06K 9/00127; G06K 9/0014; G06K 9/6282; G06K 9/6292; A61B 5/7264; Y10S 128/922
USPC .................................................. 382/128–134
See application file for complete search history.

(56) References Cited

U.S. PATENT DOCUMENTS

| | | | |
|---|---|---|---|
| 6,463,438 B1 | 10/2002 | Veltri | |
| 7,542,947 B2 | 6/2009 | Guyon | |
| 2004/0202368 A1* | 10/2004 | Lee et al. | 382/173 |
| 2004/0267770 A1* | 12/2004 | Lee | 707/100 |
| 2006/0018524 A1* | 1/2006 | Suzuki et al. | 382/128 |
| 2006/0210131 A1* | 9/2006 | Wheeler et al. | 382/128 |
| 2006/0257031 A1* | 11/2006 | Abramoff et al. | 382/224 |
| 2009/0003691 A1 | 1/2009 | Padfield | |
| 2009/0208942 A1 | 8/2009 | Liew | |
| 2010/0111396 A1* | 5/2010 | Boucheron | 382/133 |

OTHER PUBLICATIONS

Zhu, Liang; Zhao, Bo; Gao, Yang, Multi-class Multi-instance Learning for Lung Cancer Image Classification Based on Bag Feature Selection, Fifth International Conference on Fuzzy Systems and Knowledge Discovery, vol. 2, Oct. 2008, pp. 487-492.

(Continued)

*Primary Examiner* — Kim Vu
*Assistant Examiner* — Michael Vanchy, Jr.
(74) *Attorney, Agent, or Firm* — Haverstock & Owens LLP

(57) ABSTRACT

Systems and methods for implementing a hierarchical image recognition framework for classifying digital images are provided. The provided hierarchical image recognition framework utilizes a multi-layer approach to model training and image classification tasks. A first layer of the hierarchical image recognition framework generates first layer confidence scores, which are utilized by the second layer to produce a final recognition score. The provided hierarchical image recognition framework permits model training and image classification tasks to be performed more accurately and in a less resource intensive fashion than conventional single-layer image recognition frameworks. In some embodiments real-time operator guidance is provided for an image classification task.

16 Claims, 9 Drawing Sheets

(56) References Cited

OTHER PUBLICATIONS

Cheng, H. D.; Chen, C. H.; Freimanis, R.I., A neural network for breast cancer detection using fuzzy entropy approach, Proceedings of the 1995 International Conference on Image Processing, vol. 3, 1995, p. 3141.

Doyle, S.; Rodriguez, C.; Madabhushi, A.; Tomaszeweski, J; Feldman, M., Detecting prostatic adenocarcinoma from digitized histology using a multi-scal hierarchical classification approach, Conf Proc IEEE Eng Med Biol Soc., 2006, vol. 1, 4759-4762.

* cited by examiner

SYSTEMS AND METHODS FOR DIGITAL IMAGE ANALYSIS

TECHNICAL FIELD

The present disclosure relates to systems and methods for classifying digital image data and, more particularly, for classifying digital pathology image data.

BACKGROUND

Pathology imaging is one of the last fields in medical imaging yet to be digitized. Compared to other well-developed medical imaging modalities, such as Computed Tomography (CT) and Magnetic Resonance Imaging (MRI), digitized pathology images are characterized by super-high image resolution, non-uniform texture patterns, and densely-structured segments. In addition, the diversity of cancer types leads to constantly-changing image patterns, which makes it even more challenging to develop fully-automatic image classification algorithms.

Digitized pathology images are created from tissue samples stained with different methods for different diagnosing purposes, such as H&E (hematoxylin and eosin) and IHC (immunohistochemical) staining. Both of these staining methods are widely used in pathology, and H&E staining is particularly common for use in biopsy of suspected cancerous tissue.

Conventional pathology image analysis methods utilize human labor to individually examine and label the stained pathology images. This practice requires a great deal of human labor, is time consuming, and is subject to the subjectivity of the pathologist.

To date, digitalization of pathology image analysis has seen only small amounts of development. Some conventional techniques for analyzing digital pathology images involve classifying each digital pixel according to multiple features. Each of these multiple features has multiple dimensions. These multiple features are then concatenated to yield a high-dimensional data set which describes each pixel. The high-dimensional data set thus produced is then analyzed by a single layer model to produce a final classification recognition score for each analyzed pixel. Because each pixel may be described by hundreds of dimensions, in an image containing millions of pixels, the quantity of data rapidly becomes difficult or impossible to process. The requirement of a computer to keep all of the features in memory at once leads to delays in processing and high memory requirements. Conventional training techniques may take a long time and, because of processor requirements, may only use small subsets of training data to train the models. Conventional classification techniques also have the drawback of being unable to be calibrated to individual images.

It is therefore desirable to provide a faster and more efficient hierarchical image recognition framework. By reducing computing power and memory requirements, larger portions of training data may be used to train the hierarchical image recognition models proposed herein. In addition, image classification may be performed faster than conventional techniques, which permits real-time model calibration to best classify unique individual images.

The multi-layer nature of the proposed hierarchical image recognition framework allows various features of pixels to be classified separately. In certain embodiments, it further prevents the classification of one feature from influencing the classification of another.

SUMMARY

Methods and systems are disclosed herein for processing digital pathology images. One embodiment consistent with the disclosure allows a hierarchical image recognition framework to analyze image features individually on multiple hierarchical levels. A computer-implemented feature extraction method for classifying pixels of a digitized pathology image comprises the steps of generating a plurality of characterized pixels from a digitized pathology image; determining in a first layer feature analysis a plurality of first layer confidence scores based on the plurality of characterized pixels, wherein the confidence scores represent a first likelihood of each pixel belonging to a specific classification; determining in a second layer feature analysis a plurality of final recognition scores based on the plurality of characterized pixels and the plurality of first layer confidence scores, wherein the recognition scores represent a final likelihood of each pixel belonging to a specific classification; and generating an image classification confidence map representing the final image classification likelihood based on the plurality of final recognition scores. A multi-level process consistent with the disclosure permits differing features to be examined separately as different features.

BRIEF DESCRIPTION OF DRAWINGS

The accompanying drawings, which are incorporated in and constitute a part of this specification, illustrate the invention and, together with the description, serve to explain the principles of the invention.

DETAILED DESCRIPTION

Reference will now be made in detail to exemplary embodiments as illustrated in the accompanying drawings. Wherever possible, the same reference numbers will be used throughout the drawings and the following description to refer to the same or like parts. These embodiments are described in sufficient detail to enable those skilled in the art to practice the inventions and it is to be understood that other embodiments may be utilized and that changes may be made without departing from the scope of the present invention. The following detailed description, therefore, is not to be taken in a limited sense. The exemplary hierarchical image recognition techniques are presented here as applied to digital pathology images of healthy and cancerous colon organ tissue. It is understood that these image recognition techniques are not limited to use with colon organ images.

Exemplary systems and methods disclosed herein use a multi-level hierarchical image recognition framework to improve performance of an automated or semi-automated feature extraction technique over that of a single layer image recognition framework.

Figure 1:
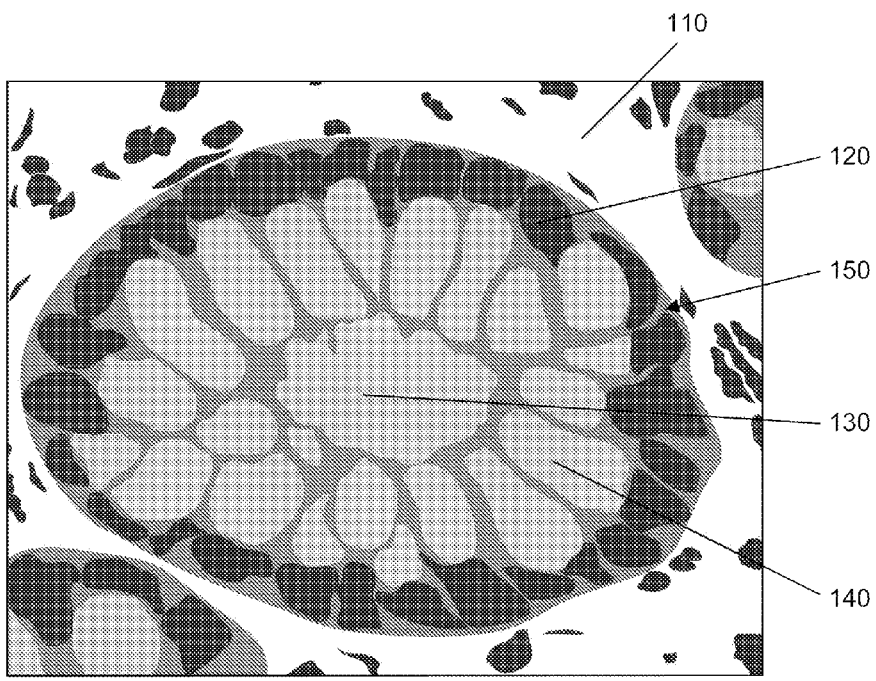
FIG. 1 shows a typical pathology image depicting hematoxylin and eosin staining of a local region of normal colon organ tissue.

FIG. 1 shows a typical pathology image 100 showing hematoxylin and eosin staining of a local region of normal colon organ tissue. Further illustrated are four different tissue types, the stroma 110, nucleus 120, lumen 130, and goblet 140. Collectively, the nucleus 120, lumen 130, and goblet 140 comprise the gland 150. The goblet and lumen taken together comprise the goblet-lumen region 160.

In exemplary embodiments described herein, region of interest (ROI) detection may be performed. ROI detection analysis seeks to automatically detect and label various regions of interest in a digitally-stored pathology image. For example, ROI detection may be used to determine the likelihood that a particular pixel or group of pixels from a digitally-stored pathology image belongs to the stroma region 110 or the nucleus region 120, as illustrated in FIG. 1.

Figure 2:
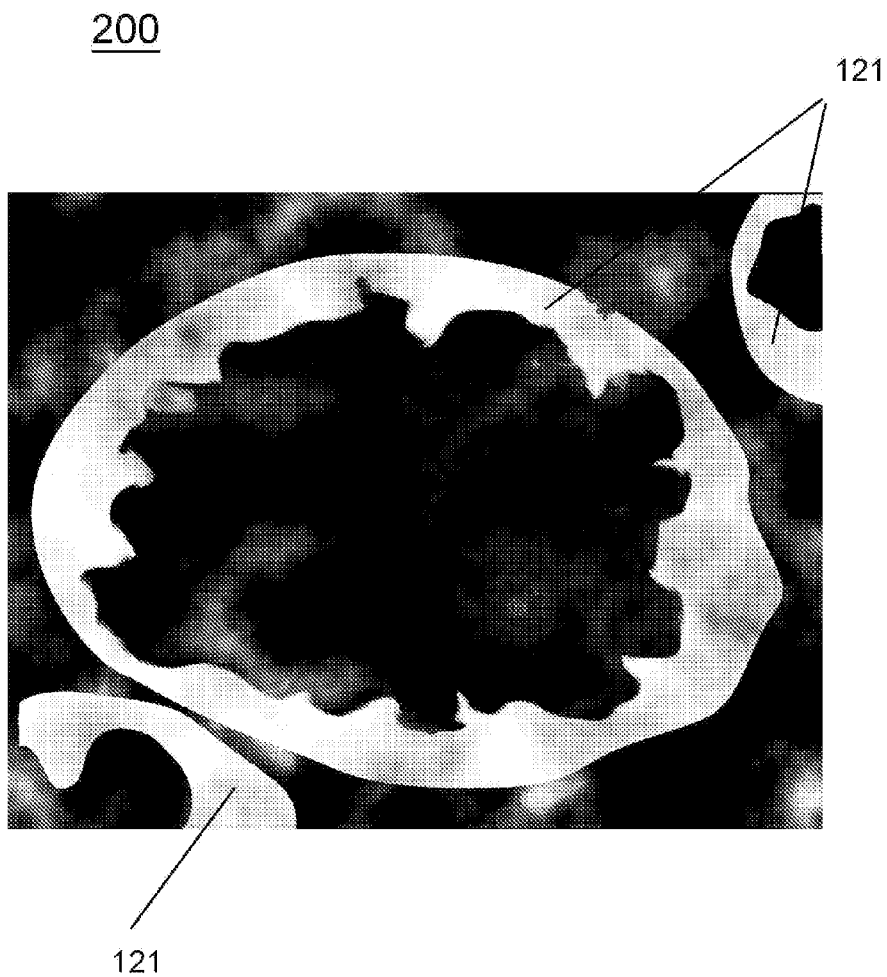
FIG. 2 shows an exemplary region of interest image classification confidence map of a typical pathology image.

FIG. 2 shows exemplary results of an ROI detection analysis performed on the typical image 100 shown in FIG. 1. The ROI image classification confidence map 200 shows the likelihood that a section of tissue is part of a detected ROI, where the ROI is the nucleus. In this example, those pixels likely to be part of the nucleus are colored a lighter color than those pixels not likely to be. The lighter a pixel is, the more likely it is to be part of the detected ROI.

Figure 3:
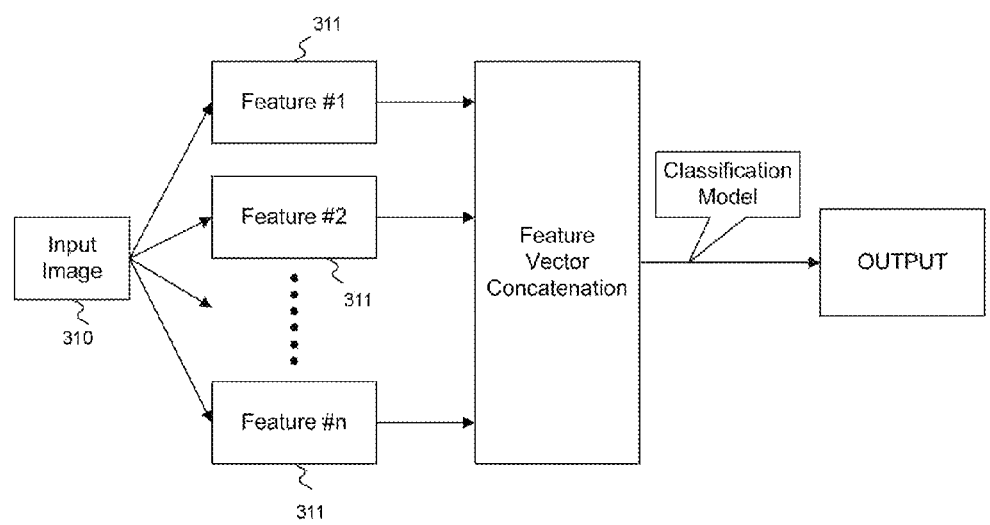
FIG. 3 illustrates a conventional single layer classification framework.

FIG. 3 illustrates a conventional single layer image classification framework. As previously described, a conventional image classification concatenates all of the single layer features 311 of an input image 310.

Exemplary methods and systems disclosed herein may be implemented in two distinct phases. An exemplary ROI detection method of the present embodiment may include a model training phase and a classification phase. A model training phase may utilize training data and machine-learning techniques to build an image classification model. A classification phase applies the image classification model to new digital pathology images in order to detect and classify ROIs. An image classification model consistent with this disclosure may comprise multiple sub-layer models. An image classification model consistent with this disclosure operates to determine the likelihood that all or some of the pixels of the digitally-stored pathology image share a common feature, such as belonging to a specified ROI.

Figure 4:
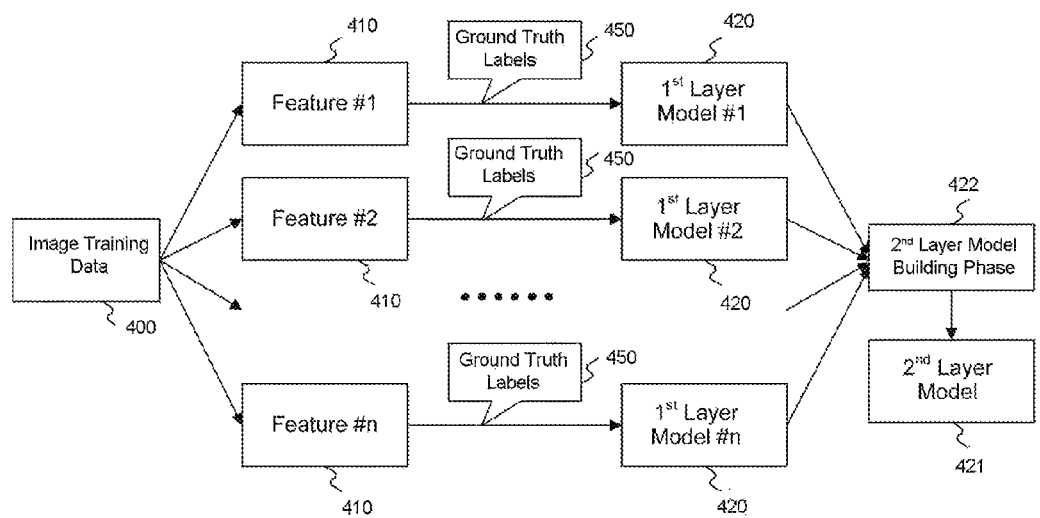
FIG. 4 shows the model training phase of an exemplary hierarchical image recognition framework.

FIG. 4 is a diagram illustrating an exemplary model training phase of a multi-level hierarchical image recognition framework consistent with the present disclosure. During the model training phase, an image classification model comprising multiple sub-layer models is built. As shown in FIG. 4, the model training phase may utilize an image training data set 400. The image training data set 400 may comprise multiple training images 401. Each training image 401 may be characterized by multiple pixel features 410 and pixel feature descriptors 511, as shown in FIG. 5.

Figure 5:
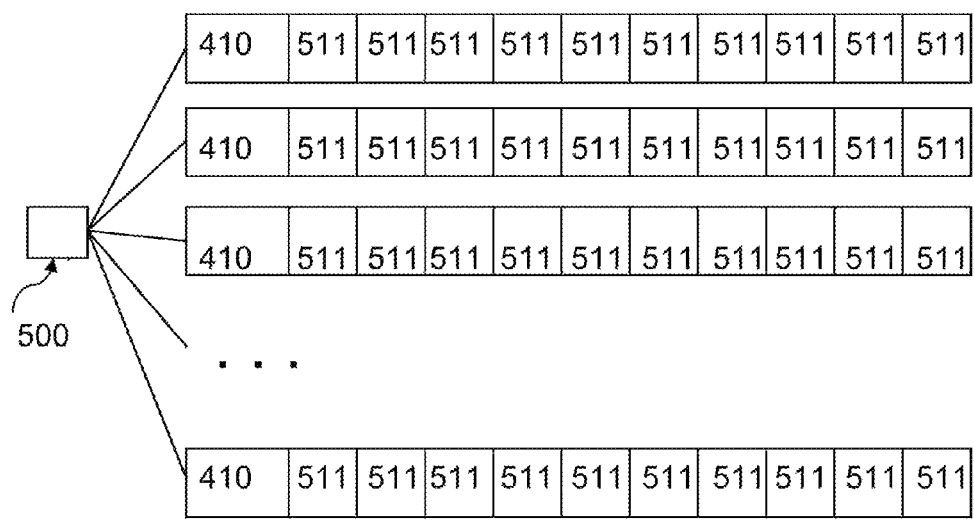
FIG. 5 is an image depicting exemplary pixel features and feature descriptor structure of a characterized pixel.

FIG. 5 is an image depicting exemplary pixel features and a feature descriptor structure of a characterized pixel. An image classification model consistent with the present disclosure may utilize characterized pixels 500 of a digital pathology image. The pixels 500 may be automatically characterized by computer-implemented methods. Pixels may be characterized, for instance, by a multiple scale intensity histogram, histogram of the gradient, or scale-invariant feature transform. A person of skill in the art will recognize various methods and techniques with which to characterize each pixel.

As shown in FIG. 5, a characterized pixel 500 may be characterized by multiple pixel features 410, each of a different feature type, such as color or texture feature types. Each pixel feature 410 may be characterized by multiple feature descriptors 511. Each pixel feature 410 may be of a feature type selected from amongst multiple possible feature types. The number of feature descriptors 511 characterizing each pixel feature 410 is the dimension of the pixel feature 410. The features 410 and feature descriptors 511 characterizing each pixel may contain data related to the pixel itself or may contain data related to the local and global neighboring pixels.

For instance, a designated pixel may be characterized by a color pixel feature 410, of a color feature type, that may comprise multiple color pixel feature descriptors 511. Each color pixel feature descriptor 511 may contain information pertaining to the color of the designated pixel or to the color of the pixels surrounding the designated pixel, either locally or globally.

Each pixel of a digital image may be characterized by any number of pixel features 410, each of which in turn may be characterized by any number of feature descriptors 511. Thus, each pixel of a digital image may easily be associated with thousands of feature descriptors 511 in total.

Figure 6:
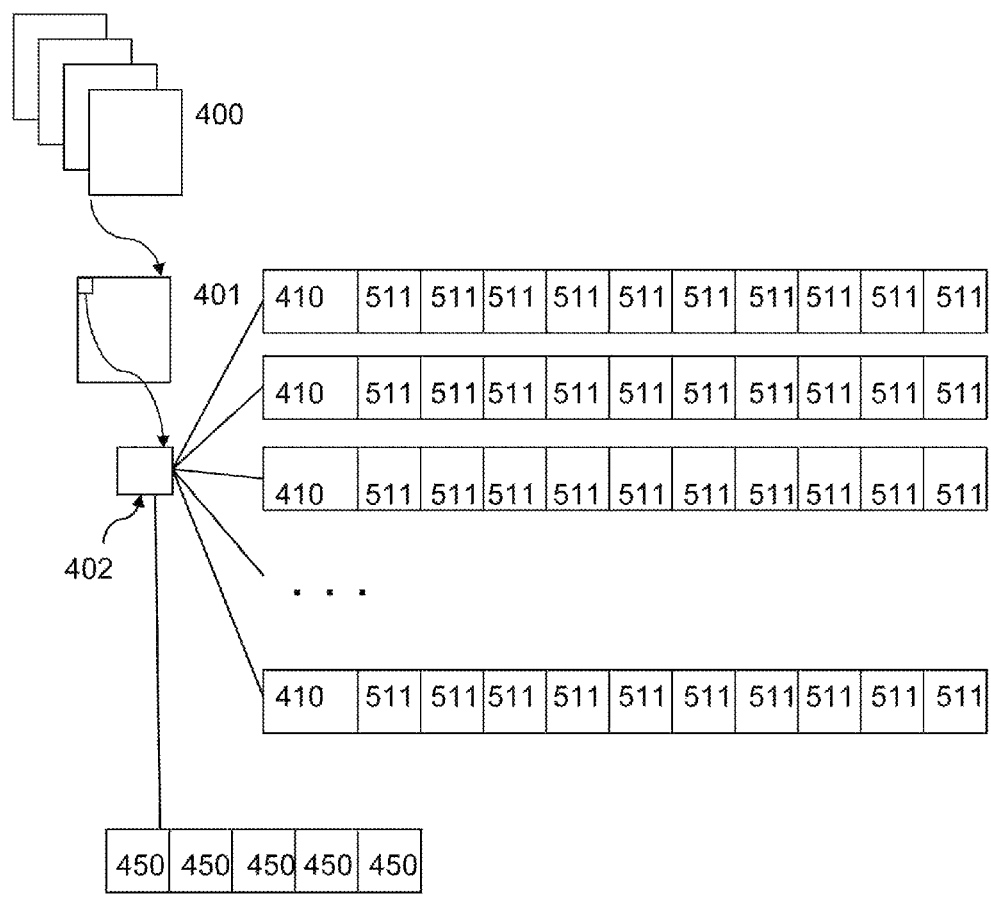
FIG. 6 is an image depicting exemplary image and pixel structure of an image training set.

FIG. 6 illustrates an exemplary structure of an image training data set 400. An image training data set 400 may comprise multiple digital training images 401 that have been manually labeled by an operator with ground truth labels 450. Individual pixels or image regions comprising multiple pixels of an training image 401 may be examined by a trained operator, such as a pathologist, and assigned a ground truth label 450 based on characteristics of the individual pixels or region. Such characteristics may include, but are not limited to, tissue type, cancer grade, etc. The ground truth label 450 applied to a pixel or region, may indicate, for instance, that the pixel or region so labeled represents gland 150 tissue. All or some of pixels 402 of a digital training image 401 may be labeled by an operator with multiple ground truth labels 450.

All or some of the characterized training pixels 402 of a digital training image 401 may be characterized by multiple pixel features 410. Each pixel feature 410 may be characterized by multiple feature descriptors 511, which may be used to produce a characterized training data set 400. Each characterized training pixel 402 of the characterized digital training image 401 may be characterized by all or some of the pixel features 410 utilized by the image classification model. It is not required that each pixel of a characterized digital training image 401 be characterized, or that each characterized training pixel 402 be characterized by all of the pixel features 410 utilized by the image classification model. Thus, each characterized pixel 402 may be characterized by multiple features 410 and multiple ground truth labels 450.

In an exemplary embodiment that seeks to perform the task of ROI detection, a pixel may be labeled with ground truth labels that indicate whether that pixel belongs to a particular ROI, such as the stroma region 110, nucleus region 120, goblet region 140, etc. In alternate embodiments, a pixel of a digital training image may be labeled with a ground truth label 450 that indicates a cancer grading diagnosis applied by the operator. In still further embodiments, ground truth labels 450 may be applied to digital training images in order to build image classification models sensitive to different ground truths.

Returning now to FIG. 4, an exemplary embodiment of the method of the model training phase operates as follows. Machine learning algorithms are utilized to build multiple first layer models 420 from the characterized training pixels 402 and ground truth labels 450 of the characterized training data set 400. A first layer model 420 may be built by associating the feature descriptors 511 of the pixel features 410 of a specific feature type belonging to the characterized training pixels 402 of the characterized digital training images 401 with the ground truth labels 450 previously assigned to each characterized training pixel 402 being used. It is not required that all of the digital training images 401 or all of the characterized training pixels 402 be utilized in building each first layer model. Thus, each individual first layer model 420 may be built to associate the feature descriptors 511 of a specific type of pixel feature 410 with a specific ground truth label 450. In this way, for instance, a first layer color model 402 may be constructed by associating combinations of values of the various color pixel feature descriptors 511 of a color pixel feature 410 with the ground truth labels 450 belonging to the characterized training pixels 402 to which the various color pixel feature descriptors 511 belong.

The model training phase of the present embodiment may then utilize machine-learning algorithms to build a second layer model 421 by combining the image training data 400 and the first layer models 420 in a second layer model building phase 422.

Figure 7:
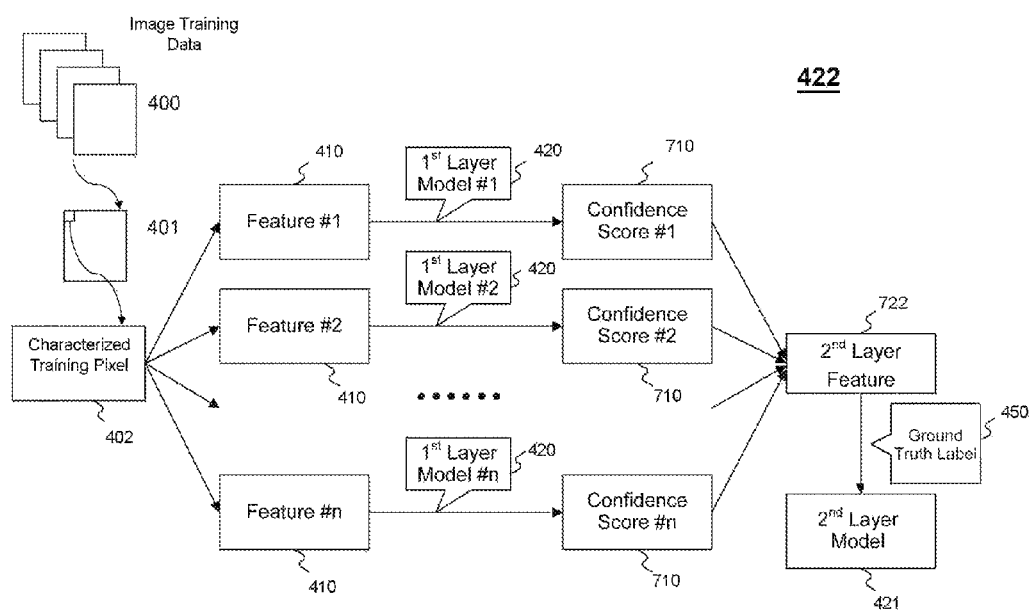
FIG. 7 illustrates a second layer model training phase of an exemplary hierarchical image recognition framework.

FIG. 7 is an image illustrating an exemplary second layer model building phase 422. A different set of characterized training pixels 402 may be chosen for the second layer model building phase 422. During the second layer model building phase 422, a first layer confidence score 710 for all or some of pixel features 410 of all or some of the characterized training pixels 402 is generated. Thus, each characterized pixel 402 may be associated with multiple first layer confidence scores 710. A first layer confidence score 710 of a characterized pixel 402 is generated by applying a first layer model 420 to the feature descriptors 511 of the pixel feature 410 associated with each first layer model 420. A first layer confidence score 710 represents the likelihood that each characterized pixel 500 should be labeled with a specific ground truth label 450 based on the feature 410 associated with the model 420 that generated the score 710.

The multiple first layer confidence scores 710 associated with a specific ground truth label 450 of a characterized training pixel 402 may then be combined into a single second layer feature 720. A second layer feature 720 is similar to a feature 410, but is comprised of first layer confidence scores 710 rather than feature descriptors 511. Each characterized pixel 402 would thus be associated with a single second layer feature 720, thereby reducing the second layer dimension of each pixel to one.

Machine learning algorithms are utilized to build a second layer model 421 from the second layer features 720 of each characterized pixel 402 and the specific ground truth label 450 associated with the confidence scores 710 of the characterized training data set 400. A second layer model 421 may be built by associating the confidence scores 710 of the second layer features 720 belonging to the characterized training pixels 402 of the characterized digital training images 401 with the ground truth labels 450 previously assigned to each characterized training pixel 402 being used. It is not required that all of the digital training images 401 or all of the characterized training pixels 402 be utilized in building a second layer model 421.

The specific ground truth label 450 from which a second layer model 421 is built is selected based on the desired task to be performed. For instance, a ground truth label 450 indicating whether the imaged tissue depicts a gland region or non-gland region may be chosen for a ROI classification task. Multiple second layer models 421 may be built, each targeted to perform a specific classification task.

Figure 8:
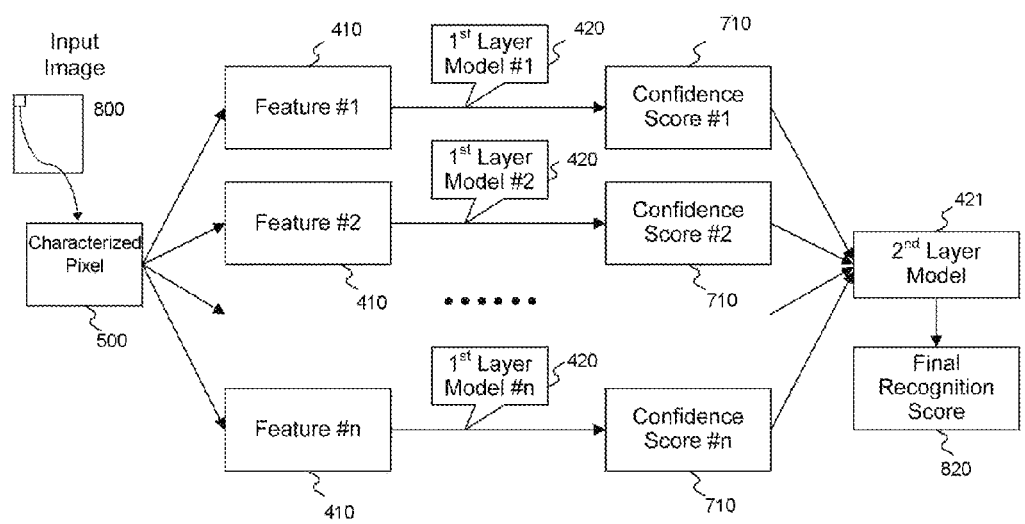
FIG. 8 illustrates an exemplary image classification phase of the hierarchical image recognition framework.

FIG. 8 is an image illustrating an exemplary image classification phase consistent with the present disclosure. During an image classification phase, the multi-layer hierarchical image recognition model may be applied in order to classify a new input image 800. All or some of the pixels of the new input image 800 may be characterized as previously described by one or more pixel features 410, wherein each pixel feature 410 is of a selected feature type and has multiple feature descriptors 511. Additionally, each pixel feature 410 utilized in the characterization of the pixels 500 may be associated with a first layer model 420 of the hierarchical image recognition model.

The image classification phase generates a first layer confidence score 710 for all or some of pixel features 410 of all or some of the characterized pixels 500 of the new input image 800. Thus, each characterized pixel 500 of the new input image 800 may be associated with multiple first layer confidence scores 710. A first layer confidence score 710 of a characterized pixel 500 is generated by applying a first layer model 420 to the feature descriptors 511 of the pixel feature 410 associated with each first layer model 420. A first layer confidence score 710 represents the likelihood that each characterized pixel 500 should be labeled with a specific ground truth label 450 based on the feature 410 associated with the model 420 that generated the score 710.

A second layer model 421 is then applied to the confidence scores 710 generated for a particular characterized pixel 500 of the new input image 700 to generate a final recognition score 720. The final recognition score 720 for a particular characterized pixel 500 represents the likelihood that that particular pixel 500 should properly be labeled with a specific ground truth label 450. In the exemplary ROI detection embodiment, the final recognition score 820 may represent the likelihood of a particular pixel 500 representing a particular region of tissue.

The final recognition scores 720 may then be used to generate an image classification confidence map. The color of each pixel of an image classification confidence map represents the likely classification of that pixel. In the exemplary ROI detection embodiment, the lighter a pixel is, the more likely it is to belong to the ROI being detected. In the nucleus detection image classification confidence map 200, shown in FIG. 2, the lighter pixels represent a higher likelihood of belonging to a nucleus region of tissue. An image classification confidence map may be used as an initial step prior to additional image analysis, for instance to classify the pixels of a particular region for further processing. An image classification confidence map may also be used as a final image analysis output, for instance to classify tissue as cancerous or healthy.

Some embodiments of the invention may perform the task of cancer grading. In order to apply the hierarchical image recognition model to the task of cancer grading, a training data set 400 specific to the task of cancer grading is required. To perform the task of cancer grading, an image recognition model may be trained with a training data set 400 that is labeled with ground truth labels 450 that may represent various cancer diagnoses, such as type or stage. To perform the task of cancer grading, multi-class level grading may be used, and multiple first layer models 420 may be used to assess the pixel features 410 of a single feature type in order to generate multiple confidence scores 710 for each characterized pixel 500 and pixel feature 410 combination. These multiple confidence scores 710 may represent, for instance, both cancer type and cancer stage. Multiple confidence scores 710 associated with multiple ground truth labels 450 may then be used to generate multiple second layer models 421 associated with different ground truths 450. In this manner, a hierarchical image recognition model consistent with the disclosure may be used to simultaneously evaluate a digital pathology image based on multiple dimensions.

Figure 9:
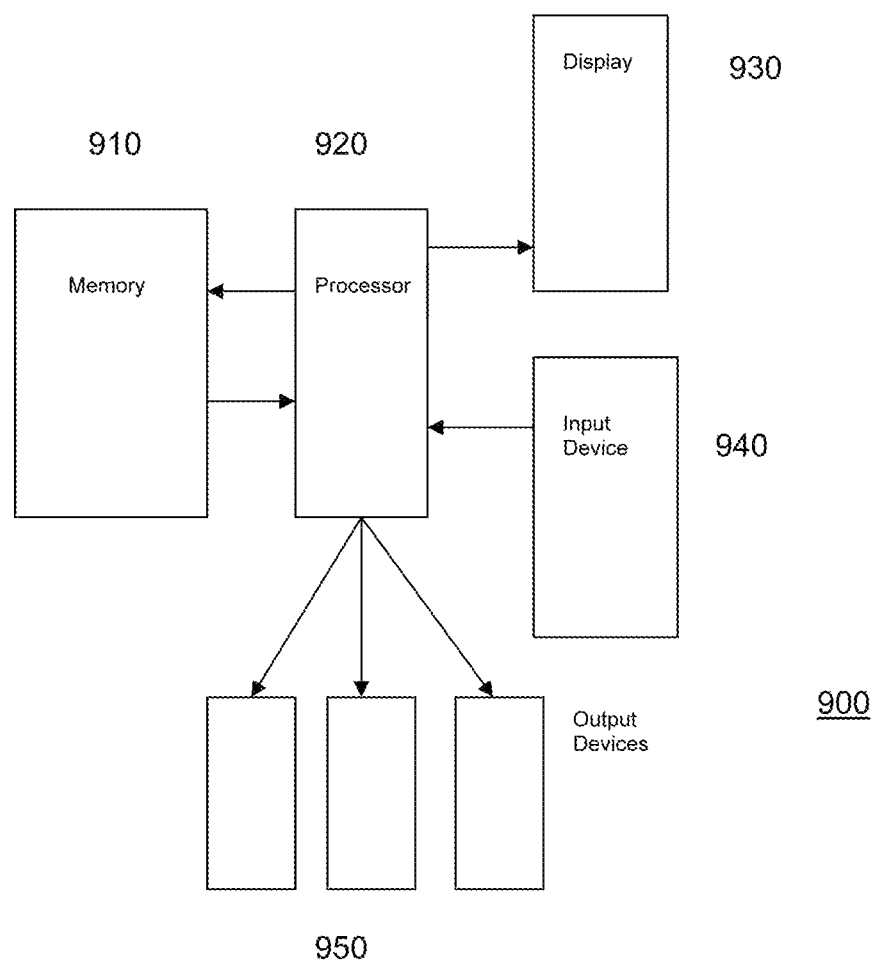
FIG. 9 shows an exemplary computer system for implementing the disclosed methods and techniques.

FIG. 9 illustrates a system 900 consistent with the present disclosure. The techniques and methods described herein may be carried out by a system comprising a memory 910, a processor 920, and a display 930. Images and data sets described herein may be stored in memory 910. Memory 910 may include any storage device capable of storing data processed by processor 920. Memory 910 may be, for example, a floppy disk, or other magnetic medium, or a blank RAM. Processing steps may be carried out by processor 920. Processor 920 may be any commonly available digital processor or may be a special purpose digital processor. Software stored on the computer memory may contain instructions to perform the steps described herein. Results of the disclosed methods and techniques may be displayed on a computer display 930. A user input device, such as a keyboard 940, may be provided to permit user interaction. Additional output devices 950, such as a printer, may also be provided.

Some embodiments permit on-line, real-time model refinement during an image classification phase. In these exemplary embodiments, an operator may guide the application of the hierarchical image recognition model. An operator may view a new input image 800 on a display 930, such as a computer monitor. After the hierarchical image recognition model classifies some of the pixels of the new input image 800, the user may approve or reject the classification. The method of the present embodiment may the update the second layer model 421 based on the operator's input. This embodiment is particularly beneficial because all digital images are different. A model trained with a particular training data set 400 may function well on some new input images 800 and poorly on other new input images 800. Because the present embodiment refines a hierarchical image recognition model based on the digital image that it is currently classifying, improved results can be achieved.

The method of this embodiment is made possible due to the advantages previously described of a hierarchical image recognition framework. Because the second layer of the hierarchical image recognition framework is of a lower dimension than a conventional single layer image framework, it requires smaller amounts of memory and less processor power. It may therefore be operated in real-time, or near real-time.

Image classification techniques disclosed herein provide tissue classification data that may provide valuable information for a variety of pathology analysis tasks. Image classification techniques disclosed herein may be used as part of a comprehensive digital image analysis system, for instance, to create top-down confidence maps to serve as input for further tissue classification techniques or for cancer analysis. Techniques disclosed herein may also be used with no additional techniques for performing tissue type or cancer classification on digital pathology images.

From the foregoing description, it will be appreciated that the present invention provides a method and apparatus for the efficient and accurate classification of a digital pathology image. The proposed hierarchical image recognition framework can be generalized to all types of pathology images. Additionally, embodiments of the methods and systems disclosed herein permit real time operator guidance of an automated image classification method.

The foregoing methods and systems have been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Embodiments of the methods disclosed herein may be implemented as a computer program product, i.e., a computer program comprising instructions tangibly embodied on an information carrier, e.g., in a machine-readable storage device, or a tangible computer-readable medium, which when executed for execution control the operation of one or more computers, processors, or logic to perform the steps of the method. A computer program can be written in any form of programming language, including compiled or interpreted languages, and it can be deployed in any form, including as a standalone program or as one or more modules, components, subroutines, or other unit suitable for use in a computing environment. A computer program can be deployed to be executed on one computer or on multiple computers at one site or distributed across multiple sites and interconnected by a communication network.

From the foregoing description, it will be appreciated that the methods and apparatus described herein to classify digital pathology images may be adapted to classify any digital images having characteristics suitable to these techniques, such as high image resolution, non-uniformly distributed texture pattern, and densely structured segments. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented feature extraction method for classifying pixels of a digitized pathology image, the method comprising:
    generating a plurality of characterized pixels from a digitized pathology image;
    determining in a first layer feature analysis a plurality of first layer confidence scores based on the plurality of characterized pixels, wherein the confidence scores represent a first likelihood of each pixel belonging to a specific classification;
    determining in a second layer feature analysis a plurality of final recognition scores based on the plurality of characterized pixels and the plurality of first layer confidence scores by applying a second layer model to the plurality of first layer confidence scores, wherein the second layer model is selected from a plurality of second layer models each of which is targeted to perform a specific classification task, wherein the recognition scores represent a final likelihood of each pixel belonging to a specific classification; and
    classifying part or all of the digitized pathology image based on the final recognition scores, wherein each pixel of the plurality of pixels is labeled with a ground truth;
    each first layer model from among a plurality of first layer models is generated by machine-learning algorithms based on a correspondence between the ground truth of each pixel of the plurality of pixels and feature descriptor values of a feature of each pixel of the plurality of pixels corresponding to a designated feature type from among a plurality of feature types; and a different first layer model is generated to correspond to each feature type from among the plurality of feature types.

2. The method of claim 1, wherein classifying part or all of the digitized pathology image further comprises:

generating an image classification confidence map representing the final image classification likelihood based on the plurality of final recognition scores; and classifying part or all of the digitized pathology image based on the image classification confidence map.

3. The method of claim 1, wherein generating a plurality of characterized pixels further comprises:

generating a plurality of features corresponding to each pixel of the plurality of pixels, wherein each feature of the plurality of features comprises a plurality of feature descriptor values and corresponds to a feature type from among a plurality of feature types; and the feature descriptor values of each feature of the plurality of features of each pixel of the plurality of pixels are determined based on data from the digital image.

4. The method of claim 3, wherein the first layer feature analysis further comprises:

determining each of the plurality of first layer confidence scores based on a first layer model from among a plurality of first layer models and the plurality of feature descriptor values of each feature of the plurality of features of each pixel of the plurality of pixels.

5. The method of claim 4, wherein, the digital pathology image is a training image.

6. The method of claim 1, wherein the second layer feature analysis further comprises:

determining each of the plurality of final recognition scores based on a second layer model and the plurality of first layer confidence scores.

7. The method of claim 6, wherein determining each of the plurality of final recognition scores comprises:

determining a temporary final recognition score based on a second layer model and the plurality of first layer confidence scores;

accepting an input from an operator;

updating the second layer model based on the input from the operator; and determining the final recognition score based on the input from the operator.

8. The method of claim 6, wherein, the digital image is a training image;

each pixel of the plurality of pixels is labeled with a ground truth;

the second layer model is generated by machine-learning algorithms based on a correspondence between the ground truth of each pixel of the plurality of pixels and the plurality of first layer confidence scores.

9. A system for image recognition analysis of a digital image comprising:

a memory having program instructions and data storage space;

a processor configured to use the program instructions to perform the steps of:

generating a plurality of characterized pixels from a digitized pathology image;

determining in a first layer feature analysis a plurality of first layer confidence scores based on the plurality of characterized pixels, wherein the confidence scores represent a first likelihood of each pixel belonging to a specific classification;

determining in a second layer feature analysis a plurality of final recognition scores based on the plurality of characterized pixels and the plurality of first layer confidence scores by applying a second layer model to the plurality of first layer confidence scores, wherein the second layer model is selected from a plurality of second layer models each of which is targeted to perform a specific classification task, wherein the recognition scores represent a final likelihood of each pixel belonging to a specific classification; and classifying part or all of the digitized pathology image based on the final recognition scores, wherein each pixel of the plurality of pixels is labeled with a ground truth;

each first layer model from among a plurality of first layer models is generated by machine-learning algorithms based on a correspondence between the ground truth of each pixel of the plurality of pixels and feature descriptor values of a feature of each pixel of the plurality of pixels corresponding to a designated feature type from among a plurality of feature types; and a different first layer model is generated to correspond to each feature type from among the plurality of feature types.

10. The system of claim 9, wherein the processor configured for characterizing each pixel of a plurality of the pixels is further configured for:

generating an image classification confidence map representing the final image classification likelihood based on the plurality of final recognition scores; and classifying part or all of the digitized pathology image based on the image classification confidence map.

11. The system of claim 9, wherein the processor configured for characterizing each pixel of a plurality of the pixels is further configured for:

generating a plurality of features corresponding to each pixel of the plurality of pixels, wherein each feature of the plurality of features comprises a plurality of feature descriptor values and corresponds to a feature type from among a plurality of feature types; and the feature descriptor values of each feature of the plurality of features of each pixel of the plurality of pixels are determined based on data from the digital image.

12. The system of claim 11, wherein the processor configured for performing a first layer feature analysis is further configured for:

determining each of the plurality of first layer confidence scores based on a first layer model from among a plurality of first layer models and the plurality of feature descriptor values of each feature of the plurality of features of each pixel of the plurality of pixels.

13. The system of claim 11, wherein, the digital pathology image is a training image.

14. The system of claim 9, wherein the processor configured for performing a second layer feature analysis is further configured for:

determining each of the plurality of final recognition scores based on a second layer model and the plurality of first layer confidence scores.

15. The system of claim 14, wherein the processor configured for determining each of the plurality of final recognition scores is further configured for:

determining a temporary final recognition score based on a second layer model and the plurality of first layer confidence scores, accepting an input from an operator,
updating the second layer model based on the input from the operator,
determining the final recognition score based on the input from the operator.

16. The system of claim 15, wherein,
the digital image is a training image,
each pixel of the plurality of pixels is labeled with a ground truth,
the second layer model is generated by machine-learning algorithms based on a correspondence between the ground truth of each pixel of the plurality of pixels and the plurality of first layer confidence scores.

* * * * *